FREQUENCY REGULATION CIRCUIT WITH SWEEP CIRCUIT

Filed Sept. 25, 1961 2 Sheets-Sheet 1

April 19, 1966 P. SCHUCHT 3,247,465

FREQUENCY REGULATION CIRCUIT WITH SWEEP CIRCUIT

Filed Sept. 25, 1961 2 Sheets-Sheet 2

3,247,465

FREQUENCY REGULATION CIRCUIT WITH SWEEP CIRCUIT

Peter Schucht, Munich, Germany, assignor to Siemens & Halske Aktiengesellschaft, Berlin and Munich, Germany, a corporation of Germany Filed Sept. 25, 1961, Ser. No. 140,558
Claims priority, application Germany, Sept. 30, 1960, S 70,668
5 Claims. (Cl. 331—4)

This invention is concerned with a frequency regulation circuit for synchronizing the frequency of a variable oscillator which is to be stabilized, with the frequency of another oscillator, such synchronizing being in a given case carried out after conversion, once or several times, with the use of constant oscillators, thereby employing a reactance circuit which is cooperatively assigned to the variable oscillator and controlled by a frequency regulation voltage jointly with a wobble voltage.

The various objects and features of the invention will be brought out in the course of the description of the embodiment and use thereof, which will be rendered below with reference to the accompanying drawings.

Figure 1:
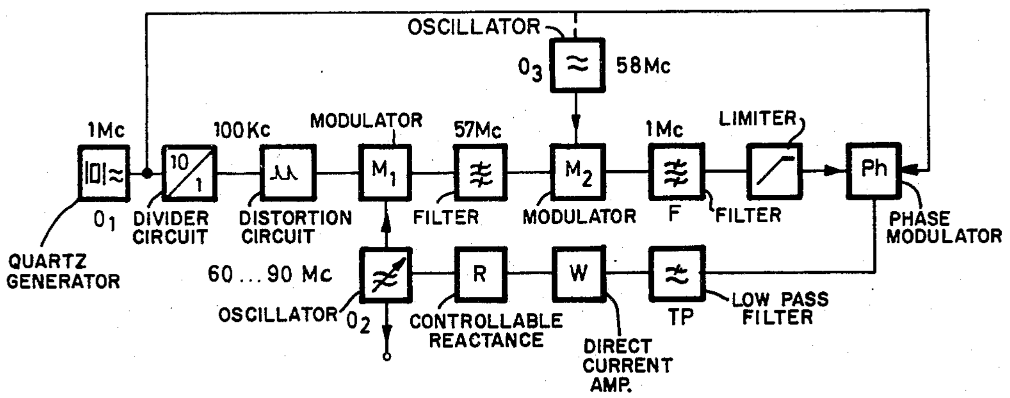
Fig. 1 PRIOR ART
Figure 2:
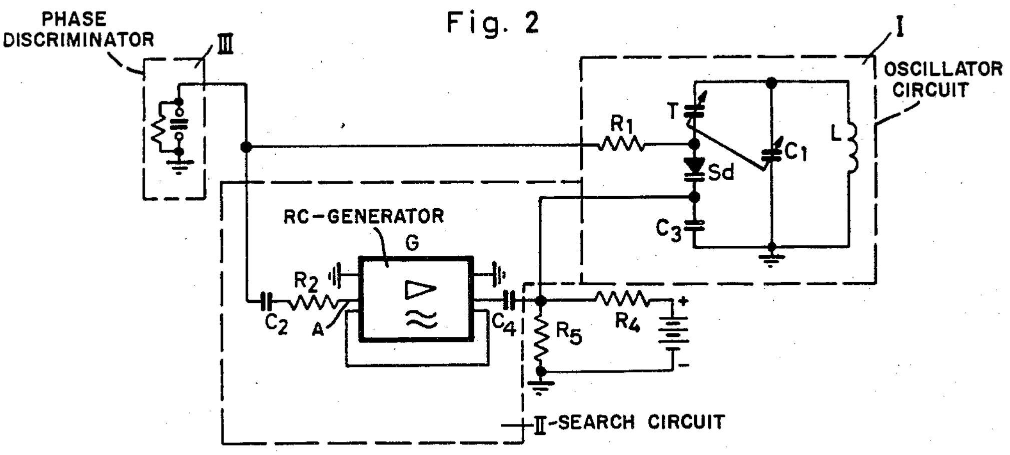
Figure 4:
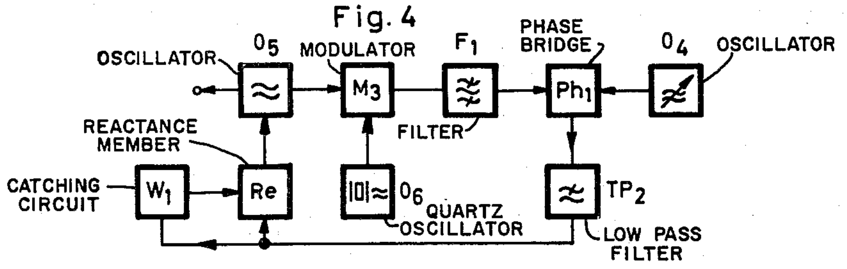
Figure 3:
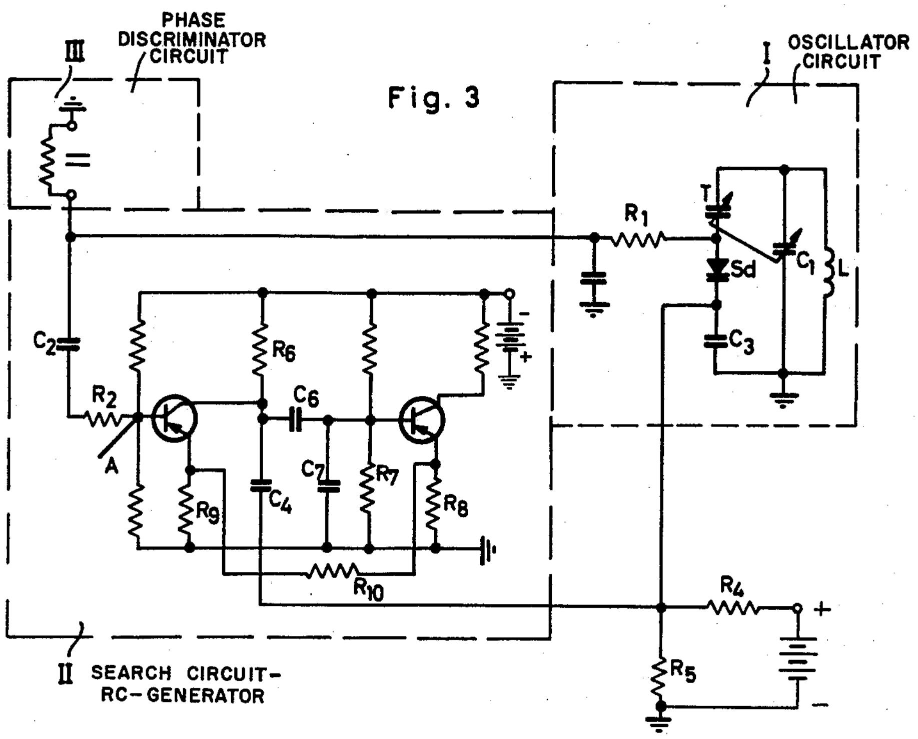
Figures 5, 6:
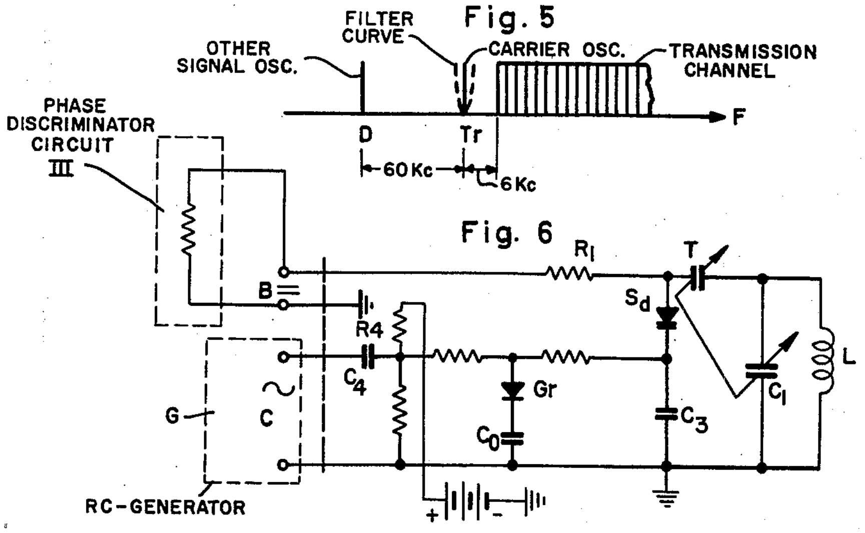

FIG. 1 shows in block diagram manner a known frequency regulation circuit for synchronizing a freely oscillating oscillator with a frequency standard;

FIG. 2 indicates an embodiment of the invention as to the principles employed, and FIG. 3 represents details thereof;

FIG. 4 shows a further example of the use of the circuit according to the invention;

FIG. 5 indicates the spectrum of a directional wireless transmission; and

FIG. 6 shows circuit details.

It is known to synchronize over a frequency regulation circuit a freely oscillating oscillator with a frequency standard, for example, the harmonic wave spectrum of a quartz generator, to the harmonic waves of which the oscillator is individually electrically locked. A known frequency regulation circuit adapted for this purpose shall now be described with reference to FIG. 1.

The frequency of the quartz generator $O_1$ which is designed for 1 megacycle, is conducted to a divider and distortion circuit which produces a 100 kilocycle spectrum up to a frequency of 33 megacycles. The oscillator $O_2$, which is tuneable from 60 to 90 megacycles, shall be in steps of 100 kilocycles rigidly synchronized to the harmonic waves. The harmonic wave spectrum is in the modulator $M_1$ converted to a low frequency position by the oscillation of the oscillator $O_2$ while being in the modulator $M_2$ converted to such low frequency position by the oscillation of the oscillator $O_3$ which is derived from the oscillator $O_1$, the conversion being such that a predetermined harmonic wave falls into the filter F for a frequency of 1 megacycle. The output voltage is limited and is in the phase modulator P*h* compared with the voltage of the oscillator $O_1$. From the phase modulator is obtained a frequency regulation voltage which is utilized for rigidly locking the oscillator $O_2$, by means of a controllable reactance R, to a harmonic wave of such oscillator. The natural catching range of the regulation circuit is determined by the bandwidth of the filter F and the limit frequency of the low pass filter TP disposed in the regulation line.

In order to increase this catching range, which practically cannot be operated beyond $\pm 10$ kilocycles without resorting to auxiliary measures, it is also known to insert in the regulation line a direct current amplifier W which oscillates by feedback with a low frequency. The closed frequency regulation loop acts as feedback coupling which in the caught condition of the oscillator $O_2$ dominates over the feedback of the direct current amplifier W, thus terminating its oscillation. The feedback coupling loop is interrupted in the uncaught or unlocked condition of the oscillator $O_2$. The direct current amplifier oscillates, thereby wobbling the oscillator $O_2$. Upon reaching the desired frequency, the oscillator is caught or locked and the oscillation of the direct current amplifier ceases.

However, the direct current amplifier in the regulation path has the drawback that it either oscillates unreliably or that its blocking is unreliable, and that the zero point (input voltage OV, output voltage OV) does not remain stable without resorting to particular expenditures. The alteration of the zero point changes the frequency of the oscillator $O_2$, thus producing an inconstancy which is oftentimes intolerable. Moreover, it is under such circumstances hardly possible to make the catching range and the locking range of the oscillator of equal magnitude, which is very often required.

The catching circuit according to the invention avoids these drawbacks by the provision of means for producing the wobble voltage by a wobble generator disposed outside of the regulation path, the oscillation of such wobble generator stopping upon appearance of a frequency regulation voltage, and means forming a reactance circuit with two decoupled inputs to which are separately conducted the frequency regulation voltage and the wobble voltage.

According to another feature of the invention, the frequency regulation voltage and the wobble voltage are, for the purpose of such decoupling, conducted to different poles of a biased silicon diode operating as a corrective tuning device, such diode having in the blocking range a capacitance depending upon the blocking voltage, the frequency regulation circuit lying thereby on one pole and the wobble voltage on the other pole of the diode. The input and the output of the wobble generator are thereby decoupled owing to the high blocking resistance of the silicon diode. Since the wobble oscillator must oscillate with low frequency and since its frequency constancy can be low, an RC-generator with transistors will require the least expenditure.

Such a circuit will not only provide for a great catching range, it will also have the favorable characteristic of providing for equally great catching and locking ranges, if the wobble voltage is selected so high that the corresponding wobble displacement is greater than the locking range which is determined by the maximum regulation voltage. It will thus be possible to catch, without impairing the operation, alterations of the wobble voltage of the simple wobble generator, caused by aging or other effects.

The circuits shown in FIGS. 2 and 3 are subdivided into parts I, II and III. Part I includes the oscillation circuit the frequency of which is to be held constant, and also the corrective tuning circuit; part II includes the means for producing the wobble voltage; and part III represents a frequency regulation circuit, for example, a phase discriminator which delivers the frequency regulation voltage.

The frequency regulation voltage supplied by the phase discriminator III is conducted over the resistor $R_1$ to the oscillation and corrective tuning part I and also over the capacitor $C_2$ and resistor $R_2$ to the RC-generator G (part II) which supplies the wobble voltage for catching. The frequency determining circuit in part I comprises the inductance L and the rotary capacitor $C_1$. Parallel thereto is disposed a series circuit comprising the trimmer capacitor T, the silicon diode S*d* as a controllable capacitance, and the capacitor $C_3$. The trimmer T is driven in common with the rotary capacitor $C_1$ so as to obtain an approximately constant frequency displacement (catching and locking range) over the entire frequency range of the oscillation circuit $C_1$, L. The silicon diode S*d* is in this embodiment biased in blocking direction by a positive voltage obtained at the voltage divider $R_4$, $R_5$. To the other pole of the silicon diode S*d* is conducted the frequency regulation voltage of the discriminator, over resistor $R_1$, while the wobble voltage of the RC-generator G is over the capacitor $C_4$ extended to the first noted pole. The diode may also be operated with reversed poling thereof, and the blocking voltage may be extended thereto in different manner. It is merely necessary that the diode must always be in blocking condition.

The RC-generator will oscillate and supply a wobble voltage to the silicon diode so long as the phase discriminator does not deliver a voltage. When the natural catching range is thereby reached, a part of the frequency regulation voltage will be over the decoupling resistor $R_2$ extended to the RC-generator, acting as a feedback coupling and thus stopping the oscillation thereof. The stop voltage is supplied at the point of the RC-generator which has the lowest wobbling voltage or at which the RC-generator can be stopped with the lowest power. The entire wobble voltage is on the silicon diode owing to the high blocking resistance thereof and therefore cannot act as an undesired feedback coupling voltage over the regulation line on the input of the RC-generator. A considerable advantage of the independent wobble oscillator, as compared with the self-oscillating direct current amplifier, resides in that the voltage required for stopping is low as compared with the maximum regulation voltage, and that the magnitude of the wobble voltage can be selected independently of the regulation voltage.

FIG. 3 shows a more detailed representation of the circuit of the RC-generator which is constructed along principles utilizing the transistor technique. The frequency determining parts are in the form of RC-combinations $R_6$, $C_6$ and $R_7$, $C_7$, together with the output and input resistors of the two transistors. In the illustrated example, the circuit oscillates at 20 cycles. The wobble range is determined by the produced voltage of, for example, 1.5 volts (peak). It is for the stopping of the oscillation of the RC-generator sufficient to conduct to the base of the first transistor at the point indicated by A, a voltage of about 0.1 volt. The resistors $R_8$ and $R_9$ serve for the feedback coupling of the two transistors, so as to keep the temperature influence small. The feedback coupling is set by means of the resistor $R_{10}$. The decoupling of the wobble voltage must be effected with such a phase with respect to the connection of the stop voltage, that an alternation of the stop voltage over the RC-generator as an amplifier, would produce the same effect on the silicon diode, such as is produced by the stop voltage acting directly on the silicon diode.

It is also possible to use two separate reactance members, for example, two silicon diodes, one serving only for the frequency regulation, and the other serving for the wobbling. In such case, the feedback coupling requirement for the wobble voltage can be secured, by suitable poling of the diode, for any desired connection at the oscillator, thereby making in given circumstances a higher wobble voltage available.

The above described circuits may be advantageously used, for example, in the known frequency regulation circuit illustrated in FIG. 1, in place of the oscillator $O_2$, the reaction circuit R and the direct current amplifier shown therein. The regulation voltage and therewith the locking range, are rigidly determined by the limiter disposed ahead of the discriminator P*h*. However, the catching range can never become greater than the locking range; accordingly, the wobble displacement can be made greater than the locking range, and the catching and locking ranges will always be equally great. If the locking range is in the above example made ±50 kilocycles, the wobble displacement may amount, for example, to ±70 kilocycles. The oscillator will then always lock to the nearest frequency.

The example shown in FIG. 1 may be modified in various ways. Thus, for example, a frequency discriminator may be disposed in back of a narrow filter (in place of the phase bridge P*h*), and the catching circuit according to the invention can be utilized to control the oscillator $O_2$ so that it comes into the pass range of the narrow filter and thus within the catching range of the frequency discriminator.

Another example for the use of the catching circuit according to the invention will now be explained with reference to FIG. 4, in which the catching circuit is indicated at $W_1$.

The oscillator $O_5$ shall oscillate with great constancy at high frequency, for example, 65 to 65.1 megacycles, and shall be continuously variable by a small amount. This frequency variation takes place depending upon the frequency variation of the oscillator $O_4$ which oscillates with great constancy in low frequency position, for example, 1 to 1.1 megacycles. The oscillation of the oscillator $O_5$ is by the oscillation of the auxiliary quartz oscillator $O_6$, oscillating at a frequency, for example, of 64 megacycles, converted to an oscillation near that of the oscillator $O_4$, and is stabilized by means of the phase bridge $Ph_1$ and the catching circuit $W_1$ cooperating with the reactance member R*e* (silicon diode). The advantage of this circuit is that the oscillator $O_5$ can with adequate locking and wobble voltages be made with very low constancy.

A further field of application of the invention is in the frequency regulation of wireless receivers, especially single sideband receivers. It is in such receivers customary to use a narrow band quartz filter for filtering out a control oscillation for the frequency regulation. The catching range is accordingly limited by the bandwidth of this quartz filter. The described catching circuit is adapted to match the catching range to the frequency target uncertainty of the receiver. Since very small regulation speeds are customary in the case of short wave receivers, so as to avoid false regulation in the case of fading and disturbances, the usual trimmer, which is adjustable by means of a regulation motor, can be combined with the silicon diode and the wobble frequency can be selected extremely low, for example, 0.1 cycle.

The catching circuit according to the invention makes it however possible to effect the simple regulation (without motor) and rapid wobbling in connection with directional ultra short wave receivers. An appropriate modification of the invention will thereby result in a further advantage which will now be explained with reference to FIGS. 5 and 6.

FIG. 5 shows the spectrum of a wireless directional transmission as noted above. T*r* indicates the carrier oscillation, the transmission band beginning with respect thereto with a spacing, for example, of 6 kilocycles. Another signal oscillation lies therebelow, for example, with a spacing of 60 kilocycles. The narrow band filter is indicated by dash lines embracing the carrier T*r*. The oscillator must be wobbled by ±30 kilocycles when the frequency error amounts, for example, up to ±30 kilocycles. However, it may thereby happen that the receiver stabilizes itself to an oscillation in the transmission channel since the transmission channel is swept in part. In order to prevent this, the wobble oscillator must first be adjusted in the direction of the other signal oscillation D, and only if it does not find the carrier T*r* can the search be continued in the direction of the transmission band. As soon as the carrier T*r* is ascertained, the wobble voltage becomes ineffective and the frequency regulation holds the carrier frequency. The start of oscillation of the wobble oscillator depends however upon various chances and cannot be readily fixed in a predetermined direction.

FIG. 6 shows a circuit which is operative to keep the first half waves of the starting oscillator in the undesired direction away from the silicon diode S*d*, by a series comprising a diode G*r* and a capacitor $C_0$ disposed in parallel with the output of the RC-generator. At the start of the RC-generator G, the half waves in one direction are suppressed until the capacitor $C_0$ is charged. The capacitor $C_0$, however, has been charged by the battery, which charge is dependent on the resistance ratio $R4/R5$ of the voltage divider extending parallel to the battery. This charge, already present at the occurrence of a wobble voltage, has no influence on the manner of operation of the circuit, since on the voltage drop at the resistor R5, which determines the charging state of the capacitor $C_0$ in the absence of wobble voltage, there is superimposed the wobble voltage of the RC-generator. For example, the capacitor $C_0$ has been charged by the battery to 5 v. and, accordingly, a wobble voltage of about 1 v. is delivered by the RC-generator, the capacitor is charged to a total of 6 v. During this additional charging process, one or more half waves of the wobble voltage of a polarity of the capacitance diode are kept away. Only after reaching the charge state determined by the charge state of the capacitor $C_0$, can the half waves of the other polarity gradually reach the silicon diode, so that the wobble range, after a few cycles on both sides, is of equal size. As soon as the wobble voltage is disconnected, the capacitor $C_0$ discharges over the blocking resistance of the rectifier G*r* to the charge state determined by the battery, so that the circuit is prepared again for a subsequent catching operation.

The manner of operation of the RC-generator is essentially determined by its construction. With respect to circuit technology a multistage, fed-back amplifier is involved, which is so strongly fed back that self-excited oscillations arise. The RC-generator illustrated in FIG. 3 is so dimensioned that it oscillates steadily in the absence of a frequency regulating voltage. From the emitter resistor R8 of the second transistor stage there is fed back over the resistor R10 a voltage to the emitter of the first stage, which voltage is so great that the oscillation state is preserved. The de-coupling of the wobble voltage is effected in the collector of the first stage, upon which the oscillating state of the feed-back amplifier is interrupted when the fed-back voltage goes below a certain value. In the circuit according to the invention this stop process is achieved by a circuit in which, to the base of the transistor of the first stage over the resistor R2, a voltage is fed of such a phase position that the feed-back voltage is partially compensated (negative feed-back). The circuit has the advantage that in the control circuit of the first transistor with a relatively very small control voltage of, for example, 0.1 v., a considerably greater wobble voltage appears at the collector of the first transistor can be stopped.

The oscillator to be regulated in its frequency is illustrated in FIG. 2 only in part, primarily as to its frequency-determining oscillatory circuit. All the other parts of the oscillator circuit, which are not necessary for the understanding of the invention and are designed in a conventional manner, are omitted in the drawing. The oscillatory circuit L, C1 is freely tunable by means of the variable condenser C1. The reactance circuit for the influencing of the oscillatory circuitry frequency through a frequency regulating voltage comprising a silicon diode S*d* (capacitance diode) which is connected in series with a trimmer capacitor T and a further capacitor C3, which are disposed parallel to the tuning capacitance C1.

Changes may be made within the scope and spirit of the appended claims which define what is believed to be new and desired to have protected by Letters Patent.

I claim:

1. In a circuit for the automatic regulation of the frequency of a variable oscillator to be stabilized, utilizing a reactance circuit in the variable oscillator circuit, which reactance circuit contains a voltage-controlled capacitance diode connected in parallel with the oscillatory circuit and which is controlled by a frequency regulating voltage obtained from a phase discriminator, in conjunction with a wobble voltage, the combination of an RC-generator for the generation of the wobble voltage arranged in a circuit branch extending in parallel to the regulation path, the output of the phase discriminator being connected over the regulating line, and the output of the RC-generator being connected over respective capacitances with respective different poles of the capacitance diode of the reactance circuit, the pole of the capacitance diode connected to the output of the RC-generator being connected with a direct current source of constant voltages for the feeding thereto of a blocking voltage, the phase discriminator being connected with the RC-generator at such a point in the circuit that on occurrence of a frequency regulating voltage a feed-back results at the RC-generator which terminates the oscillatory state of the RC-generator.

2. A frequency regulation circuit according to claim 1, comprising separate reactance members for the frequency regulation voltage and wobble voltage, respectively.

3. A frequency regulation circuit according to claim 1, comprising in further combination a rectifier connected in series with a capacitor disposed in parallel with the output of the wobble generator.

4. A frequency regulating circuit according to claim 1, comprising in further combination means operatively connected with said RC-generator, operative when the latter is stopped, to effect such phase in any output voltage thereof conducted to the capacitance diode as a result of the operation of said stopped RC-generator as a resonance amplifier, that the phase of such output voltage will be opposed to the frequency regulating voltage conducted to the capacitance diode over the regulating line at the other pole of the capacitance diode, whereby the same regulation effect is produced thereby.

5. A frequency regulating circuit according to claim 1, wherein the RC-generator comprises a multistage feed-back transistor amplifier, the wobble voltage being derived at the collector circuit of the first stage thereof, and the regulating voltage being applied to the base circuit of said first stage, operative to interrupt the oscillatory condition of such stage.

References Cited by the Examiner

UNITED STATES PATENTS

| | | | |
|---|---|---|---|
| 2,287,925 | 6/1942 | White | 331—4 |
| 2,434,294 | 1/1948 | Ginzton | 331—4 |
| 2,958,768 | 11/1960 | Brauer | 331—4 |
| 3,021,492 | 2/1962 | Kaufman | 331—36 |
| 3,048,796 | 8/1962 | Snow et al. | 331—36 |
| 3,076,151 | 1/1963 | Swanson | 331—4 |

ROY LAKE, *Primary Examiner.*

JOHN KOMINSKI, *Examiner.*